Patented Sept. 5, 1939

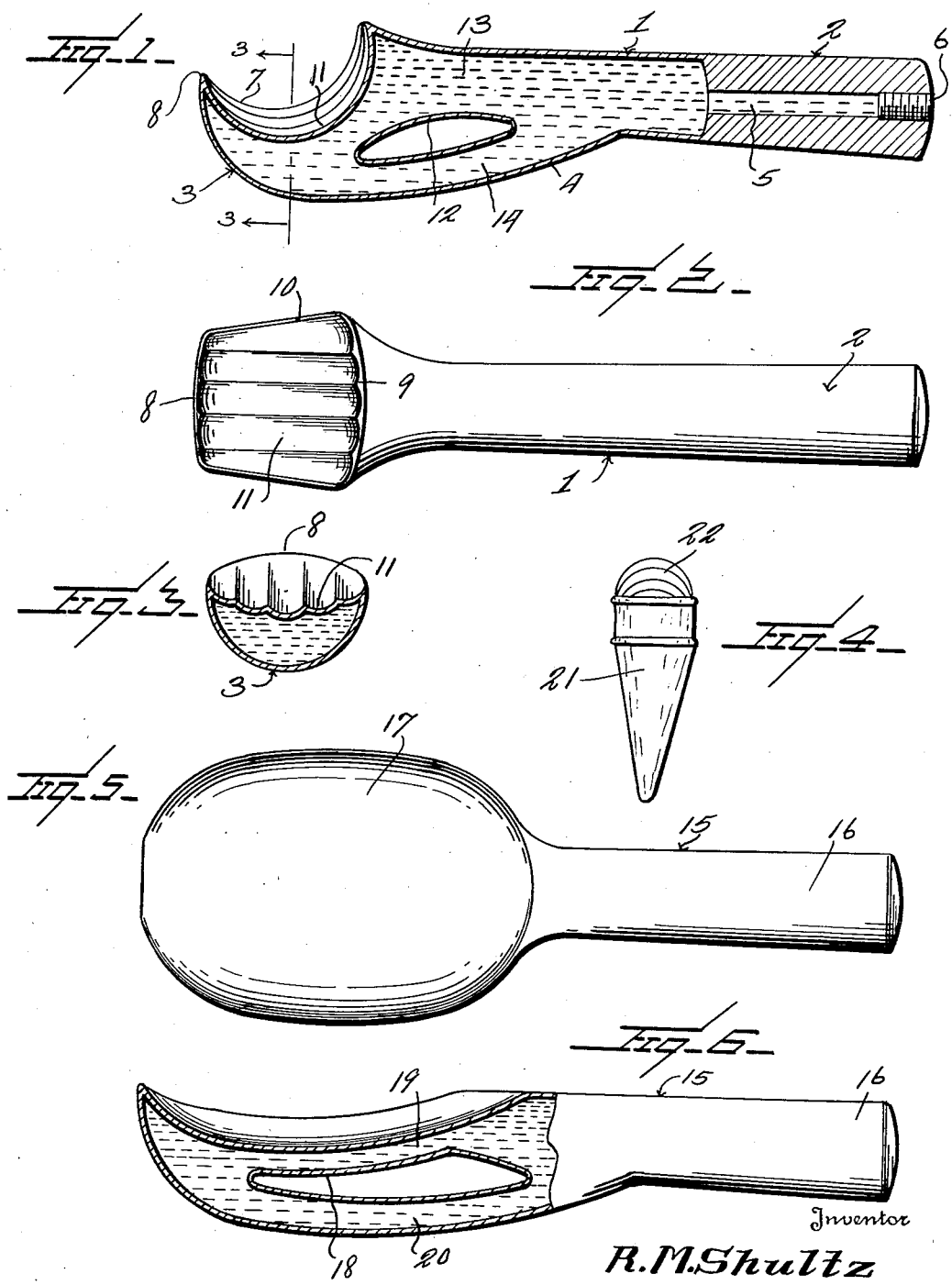

2,171,606

UNITED STATES PATENT OFFICE 2,171,606

ICE CREAM DIPPER OR DISPENSER

Rex M. Shultz, Ventura, Calif.

Application September 26, 1935, Serial No. 42,307

3 Claims. (Cl. 107—48)

This invention relates to improvements in material handling devices of the nature of scoops and spoons, and pertains particularly to an improved device of this character which is designed primarily for ladling out bulk material of the nature of ice cream, water ices, etc.

The primary object of the present invention is to provide an improved scooping device or spoon which is designed to automatically operate to effect the release of ice cream or other frozen material which may be picked up thereby without the employment of moving mechanical parts.

Another object of the invention is to provide a novel scoop or ladling device having a hollow wall construction and filled with a fluid which is designed to circulate during the use of the device in such a manner that a certain proportion of the heat units of the fluid will be transmitted to the frozen material in the scoop as the scoop is moved into a prescribed position so as to prevent the freezing of the material to the face of the scoop and thus facilitate the removal of the material therefrom.

A further and more specific object of the invention is to provide a scoop for ice cream or similar frozen materials which is of hollow construction and which is filled with a solution having a low freezing point and which is interiorly divided so as to form channels through which the fluid may flow as the temperature of the fluid adjacent the bowl of the scoop is lowered by picking up of frozen material. By this means convection currents are set up through the channels mentioned and the cooler fluid changes places with the warmer fluid so that the scooped-up material will not freeze to the scoop and it may be readily removed therefrom.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no departure from the salient features of the invention as expressed in the appended claims:

In the drawing:

Figure 1 is a view in longitudinal section of one form of the device embodying the present invention.

Fig. 2 is a view in plan of the device looking into the face of the bowl thereof.

Fig. 3 is a sectional view taken on the line 3—3 of Fig. 1.

Fig. 4 is a view illustrating upon a reduced scale the manner in which a body of ice cream is formed by the bowl of the scoop shown in Figs. 1 to 3 inclusive, and showing the cream in a cone.

Fig. 5 is a view in plan of a ladling spoon looking into the bowl of the same.

Fig. 6 is a view partly in section and partly in side elevation of the spoon illustrated in Fig. 5.

Referring now more particularly to the drawing wherein like numerals of reference indicate corresponding parts throughout the several views, the numeral 1 indicates generally a scoop designed for ladling out ice cream, water ices, or other types of frozen dessert, and as illustrated this comprises a handle portion 2 and a head portion 3. The head portion is joined to the handle 2 by a neck 4, and as shown the head and neck are of hollow construction, while the handle 2 has merely a passage 5 formed therethrough, the rear end of which is closed by the removable plug 6. By this means the hereinafter described fluid with which the head and neck are filled may be introduced.

The head portion 3 of the scoop is shaped to form a bowl or ladle 7 which has the transverse forward cutting edge 8 and the rear edge or heel 9. These edges are joined by the concave side edges 10 and the central part of the bowl between the edges 8 and 9 is of deeper concavity than the side edges 10, as is clearly illustrated in Fig. 1. In addition the interior face of the bowl 7 is fluted or grooved, as indicated at 11, these flutes running from the front to the rear edges or longitudinally of the bowl.

The interior of the head portion and neck of the scoop is divided by a wall 12 which extends transversely of the device so that there is formed in effect the two channels 13 and 14. The wall 12 is here illustrated as being hollow and opening through the sides of the scoop, but it will be apparent that this may be of solid construction if desired, so that the side faces of the scoop device will appear solid.

The interior of the scoop is filled with a solution having a low freezing point such, for example, as a solution of calcium chloride, and it is preferred that the solution of this salt be made to have an approximate specific gravity of 1.220 which would give it a freezing point of approximately 15° below zero.

Figs. 5 and 6 illustrate a spoon which may be used for handling larger quantities of frozen material than would be possible with the scoop shown in Fig. 1. This spoon is indicated generally by the numeral 15 and comprises a handle portion 16 which may be constructed like the handle 2 of the scoop and a head or bowl 17. The face or interior of the bowl 17 of the spoon is smooth throughout, but the same is of double walled construction, as shown in Fig. 6 and is provided with the transversely extending division wall 18 which forms the fluid circulating channels or tubes 19 and 20. This scoop is filled with the same low freezing solution described in connection with the scope of Fig. 1.

While the handles of the scoop and spoon have been shown as being formed integrally with the spool body, and it is preferred that the device be cast as a unit of suitable non-oxidizing metal, it is to be understood that the handle may be separately attached if desired and formed of some dissimilar material such as wood or the like.

In the use of the scoop illustrated in Fig. 1, it will be normally held in a more or less vertical position in order to fill the bowl with ice cream or any other frozen material, so that the forward edge 8 will first be forced into the material, and as the scoop is moved in an arcuate path or toward a horizontal position, the body of cream will be rolled into the bowl of the scoop. This will effect a chilling of the fluid immediately contacting the bottom of the bowl 7 and as the scoop is raised from the ice cream containing receptacle for the purpose of transferring the ball of ice cream to a dish or cone, it will be apparent that there will be a movement of the fluid within the scoop due to the convection current established because of the differences between the temperature of the fluid at the bowl and that in the rear part of the scoop or the neck portion 4. The colder fluid will tend to flow along the passage 14 to the rear of the scoop and the warmer fluid from the rear of the neck portion will move forwardly and come into contact with the bowl so that it will give up some of its heat to the cream contained therein and thus prevent adhesion of the cream to the extent that it cannot be readily removed from the bowl. If the cream is to be applied to an ice cream cone of the character indicated in Fig. 4, by the numeral 21, the body of cream is placed in the mouth of the cone and by then giving the scoop a rotating motion it can be readily freed from the cream and the formed cream body discharged from the scoop will have the fluted appearance of the body indicated at 22. The ice cream disposed in the cone or in the dish will thus be given an attractive appearance.

The same action will take place in handling cream or other frozen material with the spoon 15, but since it is not particularly desirable that the material be formed in any specified manner, the face of the spoon bowl is left smooth.

From the foregoing it will be readily apparent that in addition to the foregoing stated advantages of the present scoop the same has many additional advantages over the conventional type of ice cream dipper, in that it is not necessary to keep the dipper or the spoon in water or to dip it into the water before using. This saves time and eliminates getting water into the ice cream with the resultant formation of ice crystals. In addition less effort is required with the present scoop or spoon in the dipping of firm ice cream for the reason that the brine flowing around the cutting edge of the dipper or spoon tends to soften slightly the cream with which the scoop is in contact so that it will slide through the cream more easily. Also, as previously pointed out, the ice cream will not stick in the metal bowl of the scoop as it will do in the conventional type of scoop or dipper where moving mechanical parts must be employed for cutting it loose.

It will also be apparent that with a scoop of the type herein described, since no moving parts are employed, the same may be formed without corners or angles in which dirt and bacteria may be carried.

What is claimed, is:

1. In a ladling device of the character described, a head having a face formed to provide a material receiving bowl, a handle connected with the head, said head being of hollow construction, means within the head dividing the same to form two channels, and fluid filling the head, said fluid having a low freezing point.

2. A ladling device comprising a material receiving bowl, means forming a fluid chamber at the back of said bowl, a low freezing point fluid in said chamber having direct contact with the inner side of the bowl wall, a handle for the device, and means within the chamber dividing the same to form two fluid channels.

3. A ladling device comprising a double walled body, one of said walls being inpressed to form a material receiving bowl, a low-freezing point fluid filling said double-walled body, a partition within the body and extending transversely thereof in relatively close proximity to said bowl and dividing the body into two longitudinally extending passages, and a handle connected with the body.

REX M. SHULTZ.